(12) United States Patent
Louvain-Walters et al.

(10) Patent No.: US 8,562,029 B2
(45) Date of Patent: Oct. 22, 2013

(54) CLAMP FOR MOUNTING UPON A CYLINDRICAL MEMBER

(75) Inventors: Paul Louvain-Walters, Burscough (GB); Jonathan Fox, Shevington (GB)

(73) Assignee: Trelleborg CRP Limited, Skelmersdale (GB)

( * ) Notice: Subject to any disclaimer, the term of this patent is extended or adjusted under 35 U.S.C. 154(b) by 0 days.

(21) Appl. No.: 12/231,719

(22) Filed: Sep. 4, 2008

(65) Prior Publication Data

US 2009/0200802 A1    Aug. 13, 2009

(30) Foreign Application Priority Data

Oct. 11, 2007 (GB) .................................. 0719855.9

(51) Int. Cl.
*F16L 21/02* (2006.01)

(52) U.S. Cl.
USPC ......................................................... 285/373

(58) Field of Classification Search
USPC ............. 285/371, 373, 370, 53, 45, 414, 415, 285/419, 420, 337, 377; 166/341, 342, 343, 166/345, 359, 367
See application file for complete search history.

(56) References Cited

U.S. PATENT DOCUMENTS

| | | | | |
|---|---|---|---|---|
| 80,126 A | * | 7/1868 | Bradford | 248/62 |
| 710,721 A | * | 10/1902 | Sindlear | 285/373 |
| 1,510,838 A | * | 10/1924 | Frazier | 285/419 |
| 2,165,920 A | * | 7/1939 | Burnip | 285/373 |
| 2,230,287 A | * | 2/1941 | Curtis | 138/99 |
| 2,543,963 A | * | 3/1951 | Gaffin | 285/373 |
| 2,787,051 A | * | 4/1957 | Risley | 285/373 |
| 2,896,669 A | * | 7/1959 | Broadway et al. | 285/45 |
| 3,313,358 A | * | 4/1967 | Postlewaite et al. | 166/367 |
| 4,128,355 A | * | 12/1978 | Leaf | |
| 4,417,755 A | * | 11/1983 | Gittleman | 285/373 |
| 5,605,357 A | * | 2/1997 | Bird | 285/15 |
| 2007/0063514 A1 | * | 3/2007 | Noda | 285/373 |
| 2007/0087639 A1 | | 4/2007 | Oram et al. | |

FOREIGN PATENT DOCUMENTS

| | | |
|---|---|---|
| GB | 2286649 A | 8/1995 |
| GB | 2 288 205 A | 10/1995 |

OTHER PUBLICATIONS

Patents Act 1977: Examination Report under Section 17 for United Kingdom Counterpart Application No. GB0719855.9, 1 pg. (Feb. 11, 2008).

* cited by examiner

*Primary Examiner* — Daniel P. Stodola
*Assistant Examiner* — James Linford
(74) *Attorney, Agent, or Firm* — Blakely Sokoloff Taylor & Zafman LLP

(57) ABSTRACT

A clamp for mounting upon a cylindrical member, such as a sub-sea riser or umbilical, has a set of outer clamp shells shaped to be arranged around the cylindrical member, and preferably adapted to be secured to one another in this configuration, e.g., by means of bolts. Within the structure thus formed are inner clamp members shaped to seat upon the cylindrical member, e.g., through part-circular inner faces. The inner clamp members are biased into engagement with the cylindrical member by means of spring elements prestressed upon assembly of the clamp between opposed surfaces of the respective outer clamp shell and inner clamp member. Preferably, the spring elements each act along a circumferential direction.

8 Claims, 5 Drawing Sheets

CLAMP FOR MOUNTING UPON A CYLINDRICAL MEMBER

FIELD

The present invention is concerned with clamps for mounting upon elongate members such as sub-sea risers or umbilicals.

The present invention has been developed for use in sub-sea hydrocarbon extraction, and applications of it in this field will be discussed below, but it should be understood nonetheless that clamps embodying the invention could be used for other purposes.

BACKGROUND

Extraction of hydrocarbons such as oil and gas from underwater wells involves use of various elongate and typically cylindrical members, such as the risers which conduct the hydrocarbons themselves to the surface. There are various situations in which it is necessary to mount a clamp upon such a member which can support an axial load and resist being moved along the member. For example, an umbilical or riser is often tethered to the seabed using a tether clamp secured to an end portion of the umbilical/riser. The tether itself leads from the tether clamp to a structure which is fixed to the seabed, such as a gravity base or suction pile.

Existing tether clamps typically comprise part-cylindrical and largely non-compliant clamp shells shaped to be arranged around the riser/umbilical and drawn together using threaded fasteners to secure the clamp in place.

One of the technical challenges in this context is that the riser or umbilical may contract and expand in service, especially since it may be subject to significant variations of temperature and internal pressure. Some degree of compliance thus needs to be built into the clamp. Typically in known tether clamps it is the fasteners used to draw the clamp shells together that contribute the greater part of this compliance, but the variation in diameter which can consequently be accommodated is small.

Other clamps for mounting upon risers (typically for locating buoyancy, to prevent it from moving along the length of the riser) sometimes utilise straps to secure part-annular clamp bodies against the riser. UK patent 2286649 (granted to Balmoral Group) and UK patent 2288205 (granted to CRP Group Limited) concern clamps of this general type. The straps are formed e.g. of titanium or of composite material and are loaded with a large tension through bolts used to draw their ends together, by virtue of which the straps provide some compliance. Published US patent application 2007/0087639, filed in the names of Oram, Stokes and Reid, concerns another type of band clamp having a radially resilient member. In one embodiment this is an elastomeric body between the band and the clamp shells beneath. In another, a set of arcuate resilient leaves is provided within the clamp body and it is through these that the clamp seats upon the riser.

SUMMARY

In accordance with the present invention, there is a clamp for mounting on a cylindrical member, the clamp comprising at least two outer clamp shells shaped to be arranged around the cylindrical member, at least two inner clamp members shaped and arranged to seat upon the cylindrical member, and at least one spring element arranged between opposed surfaces of one of the outer clamp shells and one of the inner clamp members so that the spring element is pre-stressed upon assembly of the clamp around the cylindrical member and serves to bias the clamp members against the cylindrical member.

The use of one or more spring elements pre-stressed between the outer shell of the clamp and the inner clamp members enables clamps embodying the present invention to maintain a required clamping force despite significant contraction/expansion of the member on which they are mounted. They can do so without corresponding movement of the outer clamp shells, which facilitates attachment of ancillary items such as swivels and bellmouths.

The inner clamp members are preferably disposed radially inward of the outer clamp shells. They may be attached to the outer clamp shells, but such attachment necessarily permits radial movement of the inner clamp members with respect to the outer clamp shells.

The outer clamp shells are preferably provided with means for attachment to one another and together encircle the cylindrical member. Suitable attachment means include for example threaded fasteners.

In principle the spring element may act along a radial direction. Preferably, however, the spring element acts along a direction which is substantially circumferential with respect to the cylindrical member. This circumferential force upon the inner clamp member must clearly be reacted to prevent the clamp member from being moved circumferentially. This could be achieved by simple abutment of surfaces of the inner clamp member and the outer clamp shell, but in a preferred embodiment each of the inner clamp members is provided with at least one pair of spring elements arranged to apply circumferentially opposed forces to the inner clamp member. The net effect of the two spring elements is to urge the inner clamp member radially inwardly.

There may be multiple axially spaced pairs of such spring elements for each inner clamp member. This arrangement of course is particularly suited to an elongate clamp.

Preferably the or each spring element is formed as a block comprising elastomeric material. Rubber is suitable.

Preferably each inner clamp member has a substantially radially extending surface against which the spring element acts. For instance, the inner clamp members may be formed as part-cylindrical bodies with radially upstanding flanges.

Each outer clamp shell preferably provides a radially extending surface facing toward the radially extending surface of the neighbouring inner clamp member, so that the spring element is arranged between the said surfaces to bias them apart.

The said surface of the outer clamp shell may be an internal surface of a cavity within the outer clamp shell housing one or more of the spring elements.

BRIEF DESCRIPTION OF THE DRAWINGS

Specific embodiments of the present invention will now be described, by way of example only, with reference to the accompanying drawings, in which:—

DETAILED DESCRIPTION

Figure 1:
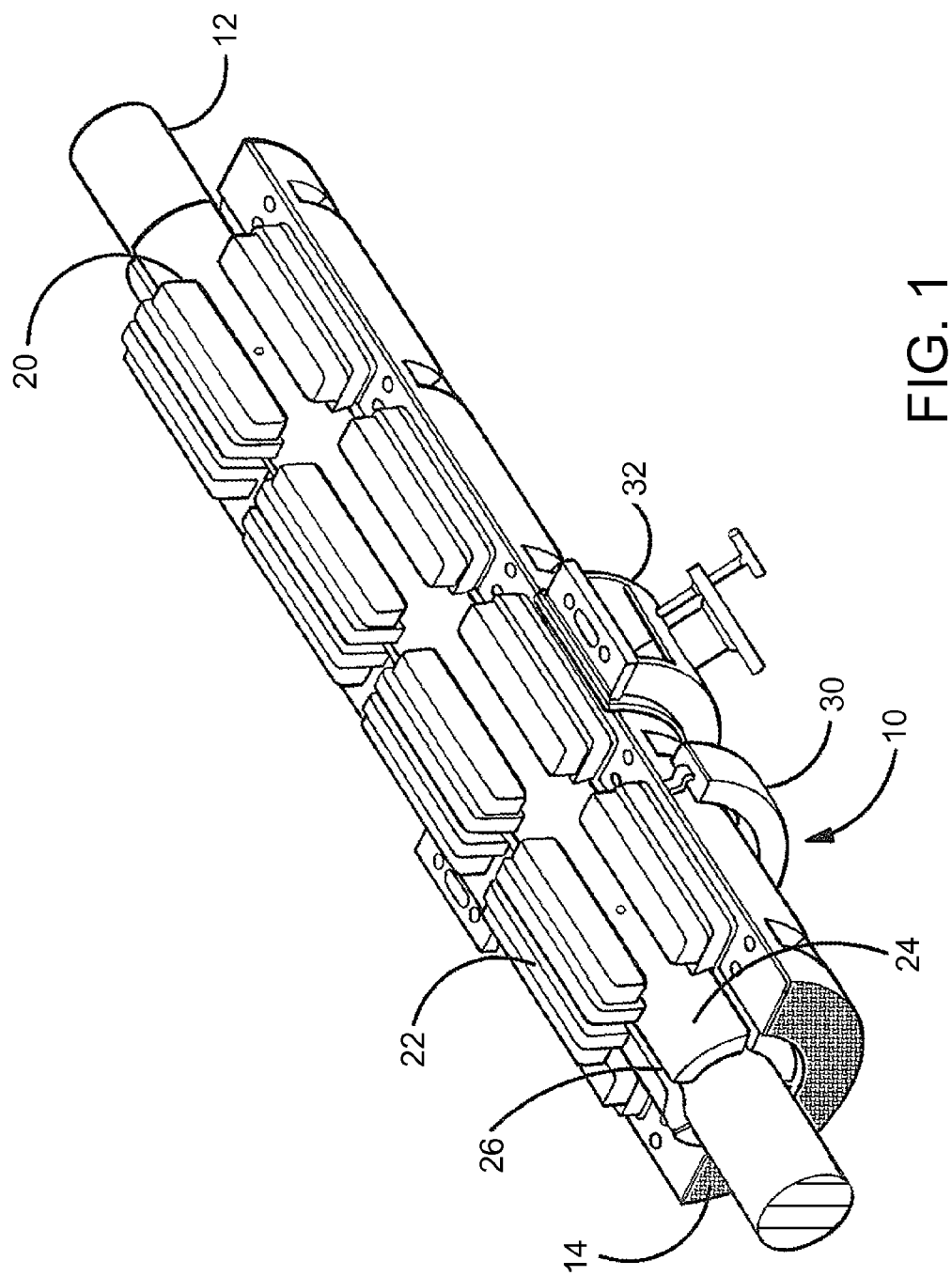
FIG. 1 shows a clamp according to a first embodiment of the present invention upon an umbilical or riser. Two outer clamp bodies are omitted from this drawing to reveal features of the clamp's internal construction.
Figure 2:
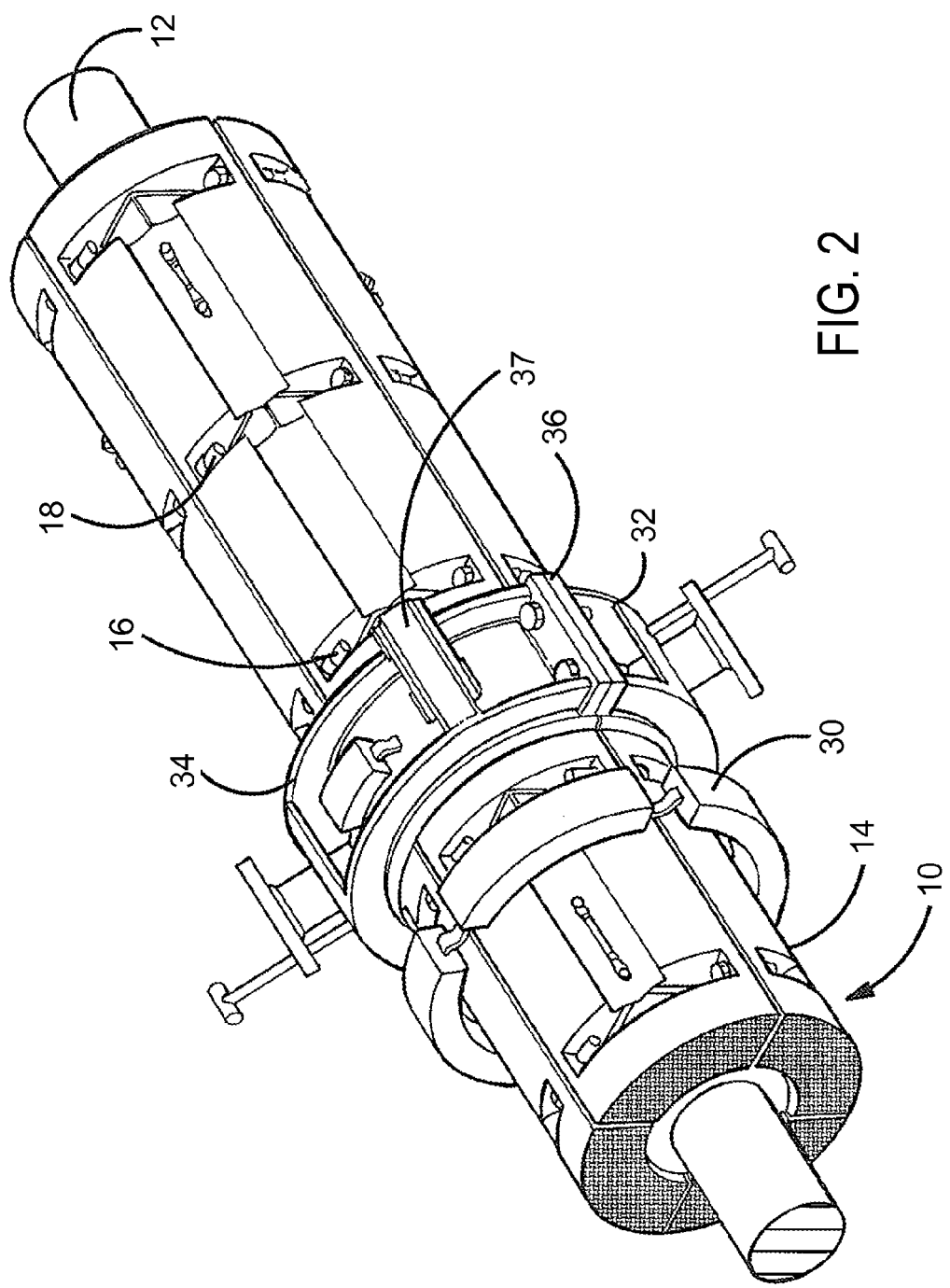
FIG. 2 corresponds to FIG. 1 except that it includes the two outer clamp bodies.

FIGS. 1 to 5 illustrate a tether clamp 10 embodying the present invention mounted upon an elongate cylindrical member 12 such as a marine riser or umbilical. Outer clamp shells 14 are in this particular embodiment generally part-cylindrical in shape, so that when assembled they form an approximate cylinder with a through-going passage for receipt of the member 12. The present embodiment comprises four quarter-cylindrical outer clamp shells 1, 2, 3, and 4, although a different number of shells could be used, for example two, three or five. They are stiff and essentially non-compliant components formed in the present embodiment from syntactic foam. Fasteners, formed in the present embodiment as bolts 16, are passed through aligned bores in adjacent clamp shells 14 to secure them together, access to bolt heads and nuts being provided by virtue of recesses 18 in the shell's outer faces.

Each of the outer clamp shells 14 has a set of internal cavities receiving respective spring elements 20. In the illustrated embodiment these are formed as elastomeric blocks and are generally cuboidal. To achieve the desired spring characteristics, the spring elements of the present embodiment are formed of rubber and incorporate multiple rigid layers (not shown) which, by controlling the elements' tendency to expand laterally under compression, increases their effective stiffness. The cavities which receive the spring elements are oversize by approximately 20% to allow the spring elements to deform under pressure.

Figure 5:
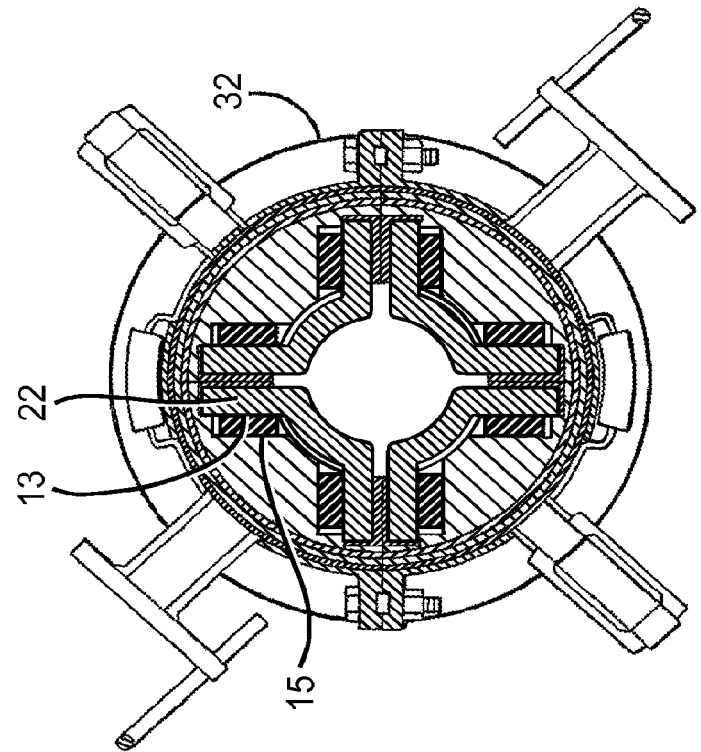
FIG. 5 is a section through the arrangement in a radial plane.
Figure 4:
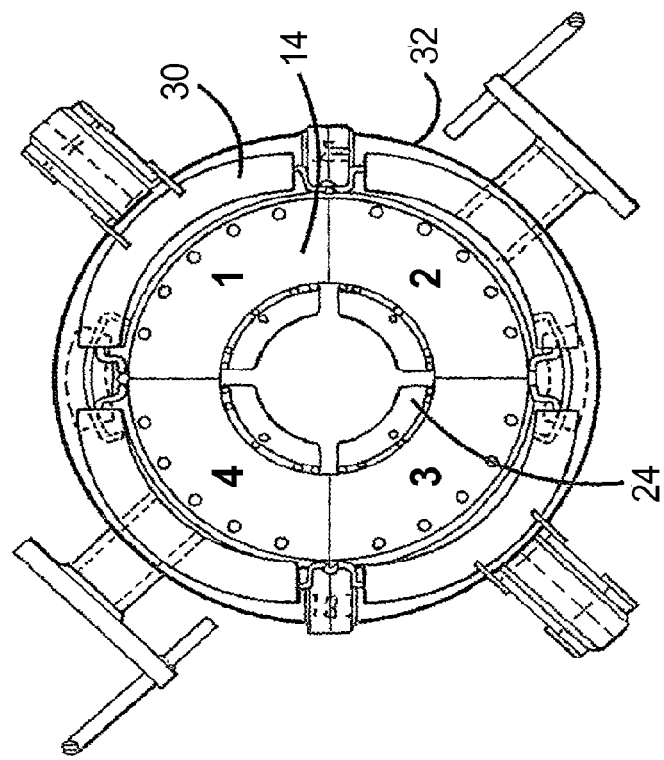
FIG. 4 is a view of the same arrangement from one end.

The spring elements 20 bear upon respective flanges 22 of inner clamp members 24 which are generally part-tubular in shape, so that each inner clamp member 24 has an inner face of generally part-circular cross section for seating upon the member 12, and together the inner clamp members (of which there are four, each carried by a respective outer clamp shell) form a cylinder lying around and embracing the member 12, e.g., as illustrated in FIG. 5. The spring elements 20 are pre-stressed between surfaces 13 of the flanges 22 and surfaces 15 of the outer clamp shells 14.

When the clamp 10 is installed and its bolts 16 tightened to bring the outer clamp shells 14 up against one another, the spring elements 20 are each compressed, along the circumferential direction, between their respective flanges 22 and the opposing inner surface of the cavity in which they are mounted. Note that there is clearance, e.g. at 26, between adjacent inner clamp members 24, so that these parts are able to move in and out to accommodate expansion and contraction of the member 12. Note also that the effect of the spring elements 20 is to urge adjacent flanges 22 of neighbouring inner clamp members 24 toward one another circumferentially—i.e. to tend to close the clearance 26—and it is this action which creates the required clamping force. The result is that the clamp is able to sustain large loads along the axial direction (i.e. along the length of the member 12) without being displaced along the member and despite changes of its dimensions due to heating, cooling, manufacturing tolerance etc.

Bolts 28 secure each inner clamp member 24 to a respective outer clamp shell 14, so that prior to its installation the clamp breaks down into just four sub-assemblies which are straightforward to handle.

The clamp 10 is provided at its exterior with sacrificial anodes 30 which inhibit electrolytic corrosion of the other metal clamp components in a salt water environment. In the illustrated example these are part-annular aluminium components.

Figure 3:
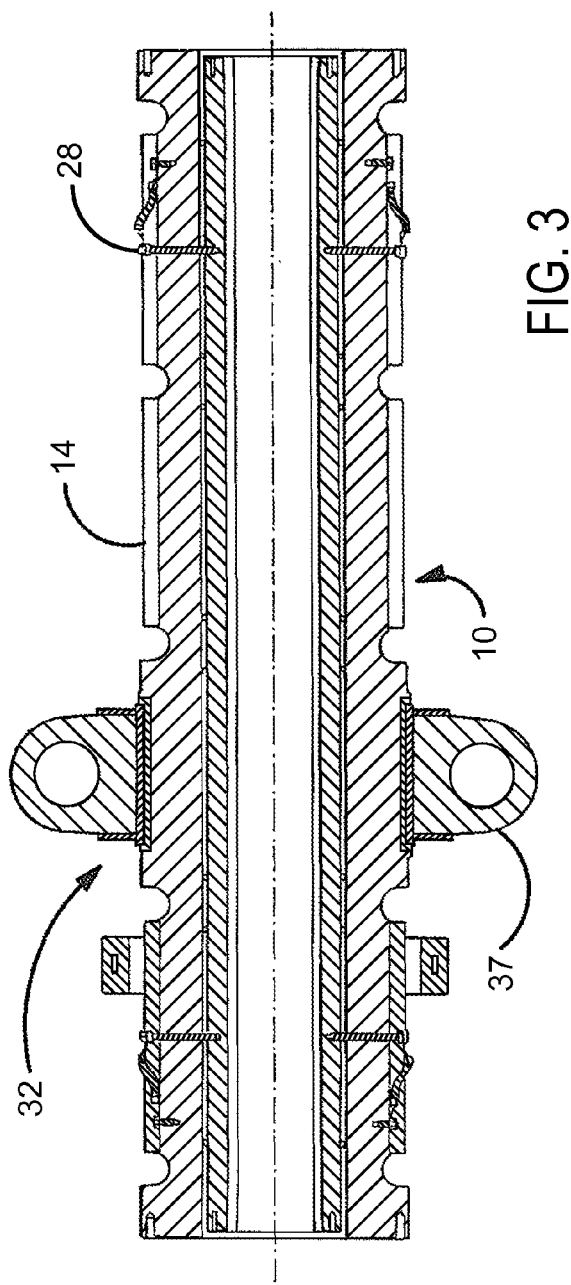
FIG. 3 is a section in an axial plane through the arrangement seen in FIG. 2.

A tether (not shown) is secured in use to a swivel formed of two swivel-halves 32 and mounted on the exterior of the clamp 10. The swivel-halves are both semi-circular, with substantial circumferential flanges 34 terminating in end plates 36 which are bolted together to secure the swivel halves to one another. The swivel is received in a shallow annular recess in the exterior of the clamp 10, as FIG. 3 shows, and is thereby prevented from moving along the length of the clamp but permitted to rotate about it. The swivel is provided with eyes 37 for receiving for example a shackle (not shown) for coupling to the tether.

Figure 6:
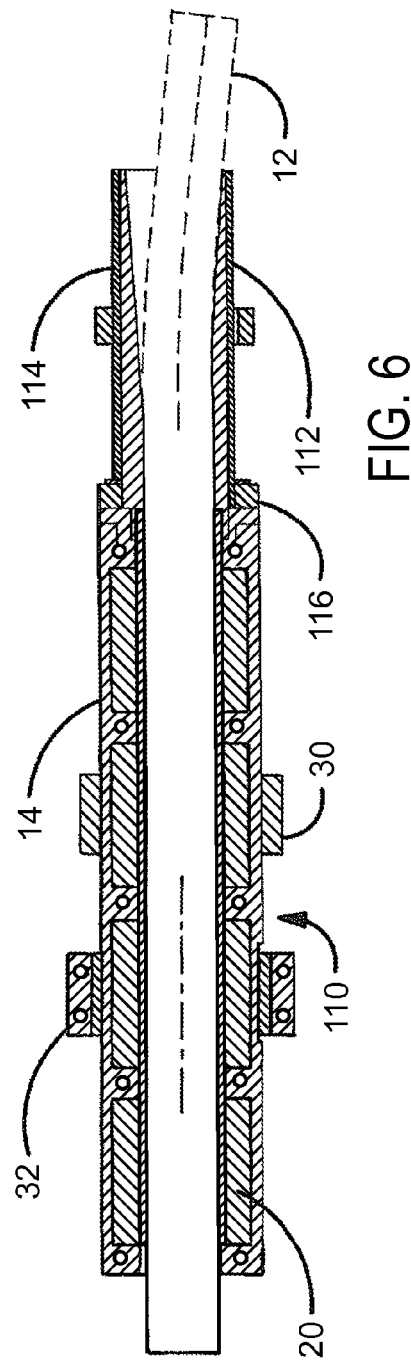
FIG. 6 is a section in an axial plane through a clamp according to a second embodiment of the present invention.
Figure 7:
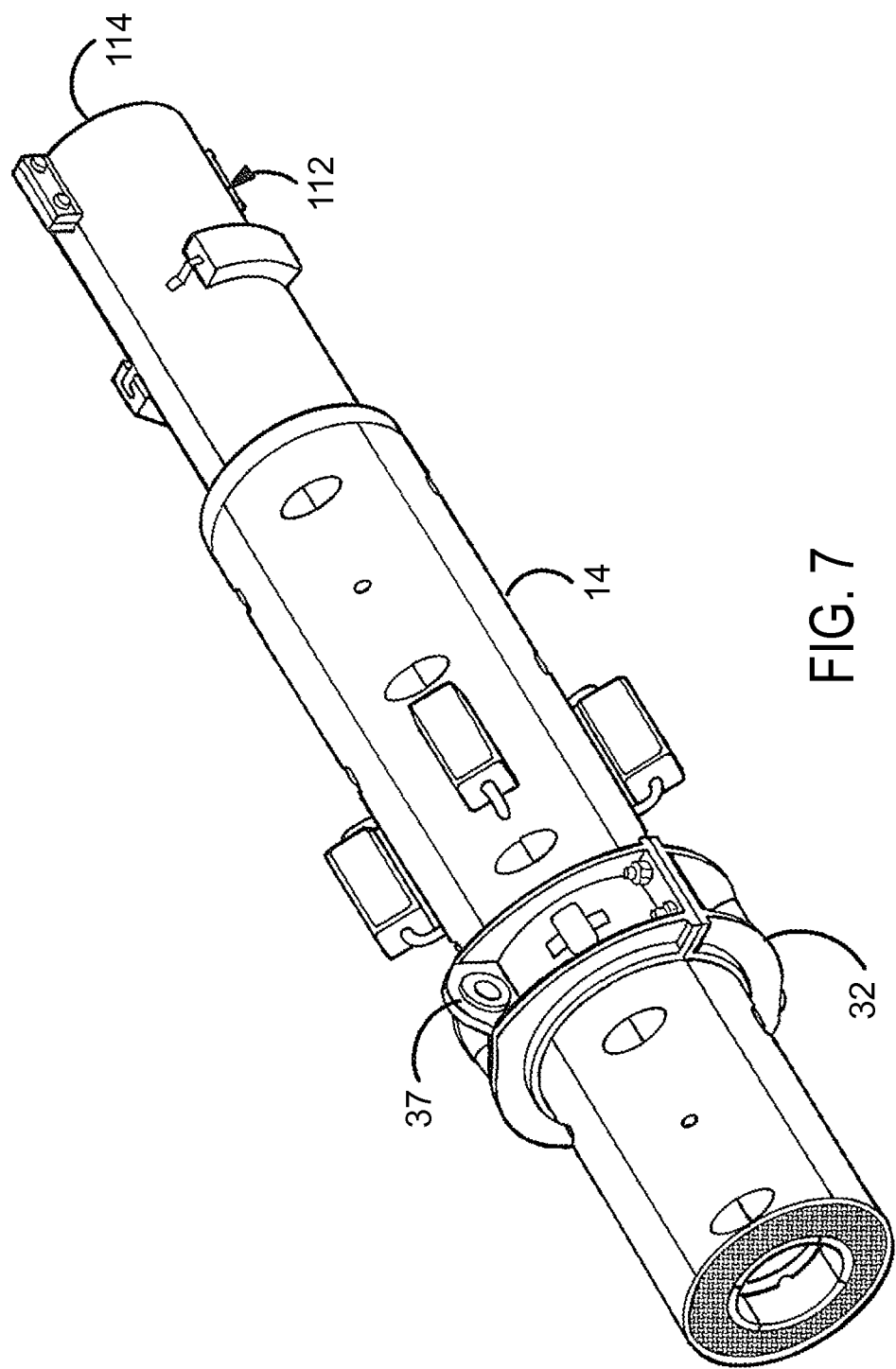
FIG. 7 shows the FIG. 6 arrangement in isometric view.

The clamp 110 illustrated in FIGS. 6 and 7 is generally similar to that described above and corresponding features are given the same reference numerals. The principal distinction between the two is that clamp 110 additionally comprises a guide collar 112 which resists excessive bending—or kinking—of the member 12 where it emerges from the clamp 10. The guide collar 112 comprises a cylindrical guide tube 114 formed in two halves for assembly around the member 12 and secured to an end face of the clamp 10 by means of bolts passed through a circular flange 116 integrally formed at the end of the guide tube. The guide tube 114 has an internal bore which increases in diameter toward its open end, passing away from the clamp 10, to accommodate some curvature of the member 12 in this region. The effect is to avoid concentration of stress on the member 12 where it emerges from the clamp.

What is claimed is:

1. A clamp for mounting on a cylindrical member, the clamp comprising:
    at least two outer clamp shells shaped to be arranged around the cylindrical member and secured to one another to form together a through-going passage for receipt of the cylindrical member;
    at least two part-cylindrical inner clamp members which are arranged within the outer clamp shells and are shaped and arranged to seat in abutment upon the cylindrical member substantially along the longitudinal extent of the outer clamp shell,
    each inner clamp member including a plurality of flanges which extend radially outwardly from the clamp member, each of the flanges providing a substantially radially extending flange surface,
    each outer clamp shell including a plurality of clamp shell surfaces which extend outward to respective stepped inner surfaces forming a plurality of cavities, which are distributed along the longitudinal extent of the outer clamp shell, and the clamp shell surfaces face toward respective flange surfaces of a corresponding inner clamp member, wherein each cavity houses a respective flange and a respective spring element that is associated with each flange; and
    the respective spring elements arranged between each of the flange surfaces and the facing clamp shell surface so that each spring element is stressed and compressed between its respective flange surface and its respective clamp shell surface upon securing of the outer clamp shells to one another around the cylindrical member and so that respective spring elements acting on each inner clamp member's flanges urge the flanges in circumferentially opposite directions, thereby biasing the inner clamp members radially inwardly against the cylindrical member.

2. The clamp as claimed in claim 1, wherein the outer clamp shells include one or more fasteners to attach the outer clamp shells to one another so that together they encircle the cylindrical member.

3. The clamp as claimed in claim 2, the one or more fasteners comprise threaded fasteners.

4. The clamp as claimed in claim 1, wherein each inner clamp member includes multiple axially spaced pairs of spring elements.

5. The clamp as claimed in claim 1, wherein each spring element is formed as a block comprising elastomeric material.

6. The clamp as claimed in claim 1, wherein each inner clamp member has a part-cylindrical inner surface for seating upon the cylindrical member.

7. The clamp as claimed in claim 1, wherein each outer clamp shell is a substantially part-annular body.

8. The clamp as claimed in claim 1 further comprising:
a swivel for attachment of a tether.

* * * * *